Oct. 9, 1962 G. H. ROHM 3,057,236
LIVE CENTER
Filed Dec. 19, 1956 3 Sheets-Sheet 1

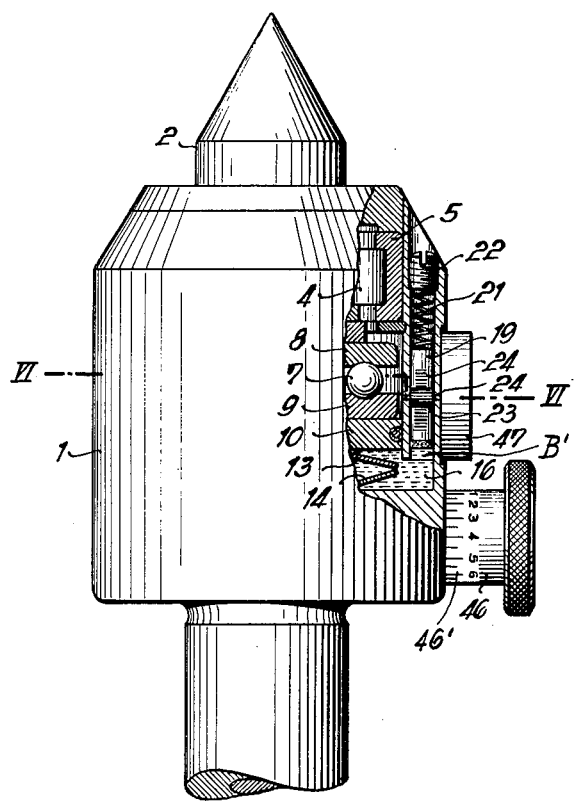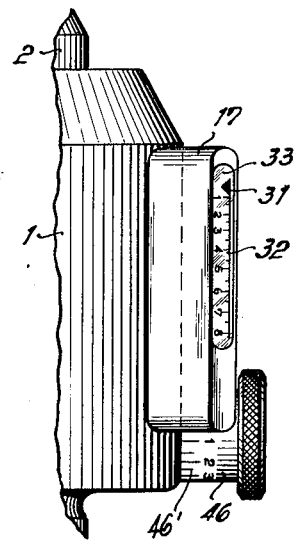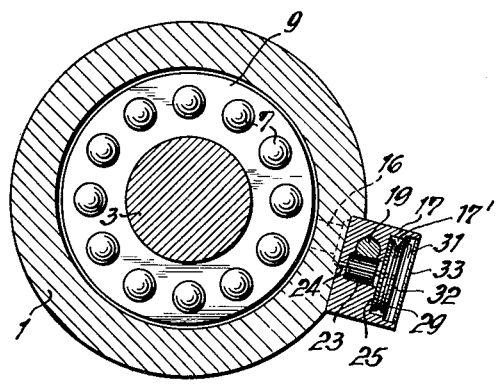

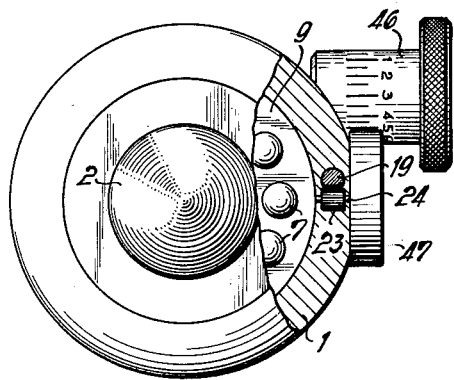
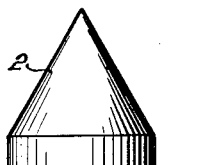
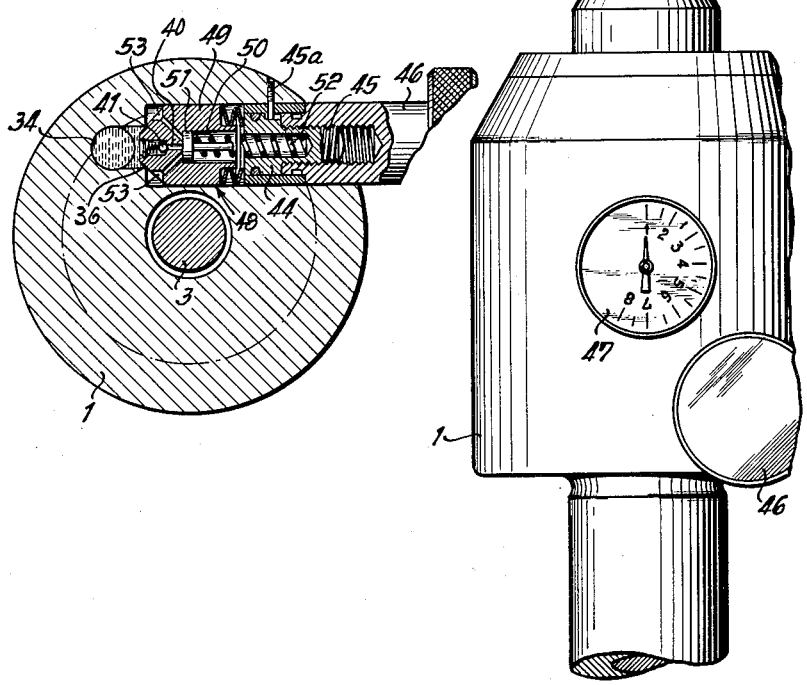

United States Patent Office 3,057,236
Patented Oct. 9, 1962

3,057,236
LIVE CENTER
Gunter Horst Rohm, Muhlstrasse 9,
Sontheim (Brenz), Germany
Filed Dec. 19, 1956, Ser. No. 629,284
Claims priority, application Germany Dec. 19, 1955
4 Claims. (Cl. 82—33)

The present invention relates to lathe centers, and more particularly to live centers, and to the means for controlling the operation thereof.

Live centers provided with a center point which is supported elastically against a liquid with pressure gauges and pressure regulators are already known. These centers permit the initial pressure exerted by the center on the workpiece first to be set and measured and then any increase in such pressure caused by the expansion of the work due to the heat developed during machining to be read on the pressure gauge and to maintain such initial pressure automatically during the entire machining operation.

The main purpose of the invention is to provide a pressure regulator in a lathe center, which regulator would pump back, without a loss, the liquid that had been relieved from the pressure chamber into an auxiliary chamber whenever a pre-determined maximum pressure on the center point has been exceeded.

Another object of the present invention is to provide in live center a pressure indicating and controlling mechanism which together form a single very small and compact unit.

A further object of the present invention is to provide in such a live center unit, the individual elements of which are of a very simple mechanical design, insuring a proper operation, as well as very accurate measurements at any time.

These and other objects of the invention are attained by providing a lathe center having a center point hydraulically supported in a sealed fluid chamber and biased outwardly for engagement with a workpiece, with a pre-determined pressure. An auxiliary chamber is associated with the sealed fluid chamber through a valve having a closure member operable to open the valve in response to an increase in pressure in the sealed fluid chamber above a pre-determined pressure. When the pre-determined pressure is exceeded and the closure member opened, fluid in the sealed fluid chamber flows into the auxiliary chamber. Further valve means are included in the closure member which valve means opens in response to a decrease in pressure in the seal fluid chamber below that of the pre-determined pressure. Thus the fluid is free to flow from the auxiliary chamber to the sealed fluid chamber. Further means are provided to return the fluid from the auxiliary chamber to the sealed fluid chamber. In this manner fluid can be relieved from the sealed fluid chamber when the pressure on the center becomes greater than that pre-determined, but the fluid is maintained in a sealed system and available to be recharged into the sealed fluid chamber should the pressure therein fall below the pre-selected valve.

The objects, features, and advantages of the present invention will be apparent from the following detailed description thereof, particularly when read with reference to the accompanying drawings, in which —

FIG. 3 shows a cross section taken along line III—III of FIG. 1;

FIG. 4 shows an elevation of a portion of the center with the pressure gauge thereon;

FIG. 5 shows an elevation, partly in cross section, of a modified embodiment of the invention;

FIG. 6 shows an end view thereof, partly in a cross section taken along line VI—VI of FIG. 5;

FIG. 7 shows a part elevation of the center according to FIG. 5; while

FIG. 8 shows a cross section similar to FIG. 2 but illustrating a third embodiment of the invention.

Figure 1:
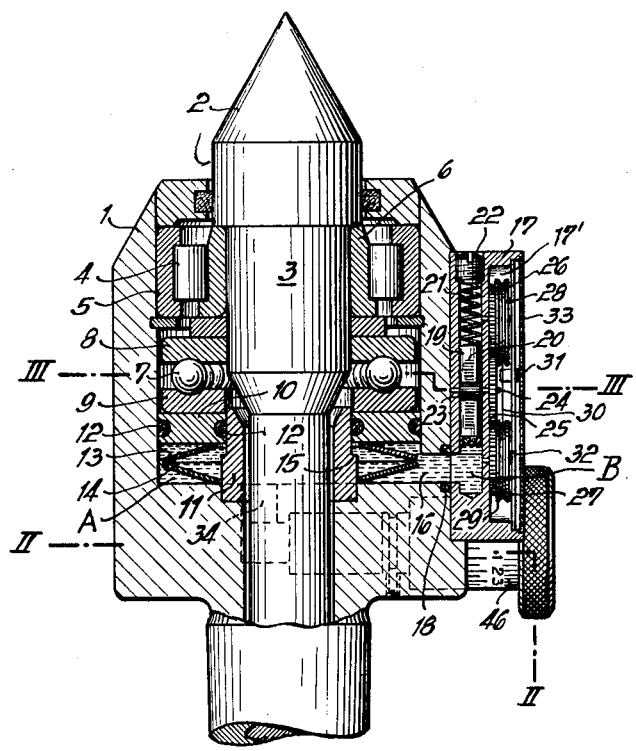
FIG. 1 shows a longitudinal section through a center according to the invention.

Referring to the drawings, and first particularly to FIGS. 1 to 4, the center comprises a housing 1, and in such housing a center tip 2 on a shaft 3 which is rotatably mounted on and supported by a radial bearing with rollers 4 which are rotatable on an outer race 5 secured to housing 1 and an inner race 6 secured to shaft 3. In the axial direction, center shaft 3 is further supported by a thrust bearing comprising balls 7 which are rotatable between two races 8 and 9. The forward race 8 bears against race 6 on shaft 3, while the rear race 9 is mounted on a ring 10 which is slidable within an annular chamber A formed by the wall of housing 1 and a bushing 11 which loosely surrounds shaft 3 and is mounted in a socketlike recess in housing 1. Ring 10 is provided with packing rings 12 which engage with the walls of chamber A and seal the chamber hermetically toward the front of the housing. Shaft 3 with race 6 thereon is thus slidable in the axial direction within housing 1 together with thrust bearing 7, 8, 9. Chamber A is filled with a pressure fluid such as oil or grease and also contains two annular cup-shaped plate springs 13 and 14 bearing against ring 10 and the end of chamber A, respectively. Bushing 11 has a shoulder 15 which limits the rearward movement of ring 10 and thus also the movement of shaft 3 against the action of springs 13 and 14. Shoulder 15 is so disposed on bushing 11 that the extent of the axial movement of ring 10 along bushing 11 is at least as large as the axial maximum movement of the center 2, 3 caused by the heat expansion of the workpiece during the machining thereof.

Chamber A which forms the main pressure chamber communicates through a transverse passage 16 with a cylindrical auxiliary chamber B in a casing 17 of a pressure gauge which extends along housing 1 and is firmly secured thereto. A packing ring 18 may be additionally provided at the point of connection between the mouths of passage 16 and chamber B to avoid any pressure leak. The cylindrical chamber B of the pressure gauge contains a long piston 19 which is slidable therein and provided along one side of its longitudinal surface with a row of gear teeth 20. The front end of piston 19 is acted upon by a coil spring 21 which may be adjusted by a setscrew 22 so as to regulate the pressure of the fluid in chambers A and B acting upon the rear end of piston 19 in proportion to the pressure of center 2, 3 upon the fluid. Thus, the greater the pressure to be exerted by the center upon the workpiece, the greater should be the tension of spring 21. Once such pressure has been properly adjusted, no further changes need be made, and setscrew 22 may then be secured in position by suitable locking means until a different center pressure is required.

Gear teeth 20 on piston 19 mesh with those of a pinion 23 secured to a shaft 24 which is rotatably mounted in the wall of casing 17 facing toward housing 1 and an inner wall thereof, and carries a gear 24 at its outer end and within a chamber 17' separate from the cylindrical chamber B. Gear 24 meshes with two gears 26 and 27, each carrying a pulley 28 and 29, respectively, which are connected with each other by an endless cord or wire 30 which, in turn, carries a pointer 31. As shown particularly in FIG. 4, a scale 32 is mounted underneath pointer 31, and the opening at the upper side of chamber 17' is closed by a transparent plate 33 through which the pressure as determined by the position of piston 19 may be read on pointer 31 and scale 32.

The main pressure chamber A in housing 1 is further connected by a passage 34 with a tangential cylindrical chamber 35 in housing 1, the obttom of which forms a valve seat 36 for a valve piston 37 which is slidable in axial direction within chamber 35. Piston 37 has a longitudinal grooves 38, radial grooves 39 and a central passage 40 in which a check valve is provided which consists of a seat at the outer end of passage 40 and a ball 41 which is normally held on the seat by a spring 42. Piston 37 is normally depressed against its seat 36 by a plurality of cup-shaped plate springs 43 which act at one side upon the outer surface of piston 37 and at the other side against the head 44 of a threaded bolt 45 which is axially adjustable by being screwed into a cap 46 with a knurled head and which may be locked against rotation by a setscrew 45a the cup-shaped plate springs 43 are slidably inserted in the tangential cylindrical chamber 35 and seal this chamber on the back side. A dial 46′ on screw cap 46 indicates the pressure exerted by springs 43 upon valve piston 37.

The modification of the pressure gauge according to the invention as illustrated in FIGS. 5 to 7 differs outwardly from the embodiment according to FIGS. 1 to 4 by the fact that the cylindrical chamber B′ containing the compression piston 19 does not project from housing 1 but is contained within the cylindrical confines of the latter. The row of teeth 20 on piston 19 again meshes with those of a pinion 23, shaft 24 of which, however, opreates a dial gauge 47 which is mounted directly on the outer wall of housing 1. In all other respects, the embodiment according to FIGS. 5 to 7 is similar to that shown in FIGS. 1 to 4.

Figure 2:
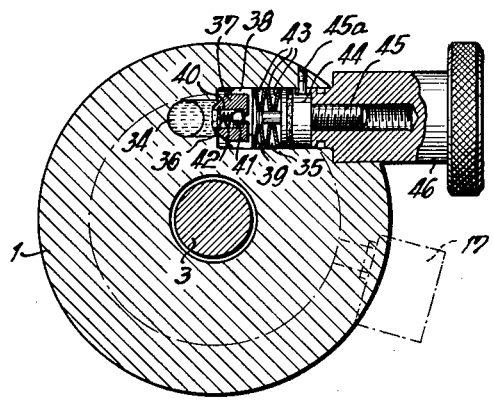
FIG. 2 shows a cross section taken along line II—II of FIG. 1.

FIG. 8 illustrates a modification of the pressure regulator as shown in FIG. 2. Housing 1 is likewise provided with a tangential cylindrical chamber 48 in which a valve piston 49 is slidably mounted relative to the valve seat 36. Valve piston 49 also contains a check valve 41 within its central passage. However, valve piston 49 is of greater length than piston 37 shown in FIG. 2 and also contains a cylindrical chamber 50 which communicates with the main chamber 48 through oblique channels 53. Chamber 50 contains a piston 51 which is acted upon by a relatively weak spring 52 so as normally to close channels 53. If by the expansion of the workpiece the pressure in chamber A as shown in FIG. 1 is increased beyond a certain limit, the pressure fluid, after lifting valve piston 49 off its seat 36 forces piston 51 within chamber 50 outwardly against the action of spring 52 and enters into chamber 50 thereby relieving the pressure within chamber A. As soon as the workpiece contracts and its pressure upon the center decreases, or when it is removed entirely, springs 13 and 14 return the center to its forward position. This, in turn, produces a decrease in pressure at the inner side of check valve 41, and by the combined action of such decrease in pressure with the pressure of spring 52 upon piston 51 check valve 41 opens and any amount of pressure fluid, regardless how small, which might have entered into chamber 50 will be completely pumped out of it and returned to pressure chamber A.

As already indicated, center 2, 3 is subjected through bearings 4 to 9 to the normal pressure of springs 13 and 14 and that of the pressure fluid in chamber A which, in turn, is held under pressure by piston 19 under the action of spring 21. This pressure may be adjusted by setscrew 22 to different values depending upon the size of the center used, each value corresponding to the predetermined minimum center pressure upon the workpiece. The center 2, 3 is first inserted in the proper position within housing 1 by moving the tailstock of the lathe forwardly. This pressure is transmitted through bearings 4 to 9 to the pressure fluid in chamber A and is indicated on the gauge 17 or 47, respectively. Previously, the pressure regulator 46 has been adjusted to whatever pressure the respective workpiece requires, for example, to 400 kg. As soon as this pressure is attained by the adjustment of the tailstock, machining of the workpiece may commence. If the workpiece should then expand due to heating, its pressure upon center 2, 3 increases, and this pressure is transmitted upon the pressure fluid. Since the pressure is set at a value of, for example, 400 kg., relief valve 37 or 49, respectively, is actuated and the pressure fluid flows through grooves 38 and 39 or channels 53, respectively, into the chamber at the rear or inside of the valve piston, thereby relieving the excess pressure. Consequently, there will never be any substantial increase in pressure. As soon as the pressure upon the center tip decreases or is entirely relieved by the removal of the workpiece, springs 13 and 14 force the center 2, 3 and thus also ring 10 back to their initial position so that a decrease in pressure is formed in pressure chamber A resulting in a decrease in pressure on check valve 41 so that the latter opens and the fluid will be pumped by the cup-shaped plate springs 43 or piston 51 from the auxiliary chamber 35 to the main pressure chamber A.

Even though my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In a lathe center having a center point hydraulically supported and biassed outwardly for engagement with a workpiece, a sealed fluid chamber supporting said center point, an auxiliary chamber operatively communicating with the sealed fluid chamber through a valve disposed therebetween, said valve having a closure member comprising a piston mounted for sliding movement in the auxiliary chamber and urged into engagement with a valve set by a predetermined pressure spring loaded means disposed in the auxiliary chamber and operable in response to an increase in pressure in the sealed fluid chamber above a predetermined pressure to open said valve, further valve means comprising a first passageway in said piston and a second closure member disposed in said first passageway and operable to open the passageway in response to a decrease in pressure in the sealed fluid chamber below said predetermined pressure, said piston having a second passageway therein and an axial bore operatively communicating through the second passageway and the first passageway with the valve to receive fluid from and return fluid to the sealed fluid chamber, and means disposed in the piston to pump fluid in the auxiliary chamber back into the sealed fluid chamber when the pressure therein decreases below a said predetermined pressure.

2. In a lathe center according to claim 1 wherein said fluid pumping means comprises a second piston mounted for sliding movement in the axial bore and urged along the axis of the first-named piston towards the valve.

3. In a lathe center according to claim 2 further comprising a second auxiliary chamber communicating with the sealed fluid chamber, a piston mounted for sliding movement in the second auxiliary chamber in response to changes in pressure in the sealed fluid chamber, a spring bearing upon said piston from a side of the piston opposite to that in communication with the sealed fluid, a setscrew adjustably mounted in contact with the end of said spring opposite to that in contact with said piston, and means indicating the position of the piston in the auxiliary chamber.

4. A lathe center according to claim 1 wherein said last-named means further comprises indicator means and means connecting the piston and the indicator means to translate movement of the piston to the indicator means.

References Cited in the file of this patent

UNITED STATES PATENTS

| | | |
|---|---|---|
| 115,982 | Porteous | June 12, 1871 |
| 2,056,586 | Rohm | Oct. 8, 1936 |
| 2,197,126 | Dick | Apr. 16, 1940 |
| 2,377,594 | Weberg | June 5, 1945 |
| 2,392,037 | Galloway | Jan. 1, 1946 |
| 2,402,979 | Barto | July 2, 1946 |
| 2,538,188 | Brietzke | Jan. 16, 1951 |
| 2,590,583 | Taylor | Mar. 25, 1952 |
| 2,645,242 | Monnich | July 14, 1953 |
| 2,691,301 | Guest | Oct. 12, 1954 |
| 2,735,443 | Beck | Feb. 21, 1956 |

FOREIGN PATENTS

| | | |
|---|---|---|
| 752,792 | Great Britain | July 18, 1956 |

OTHER REFERENCES

Design News, Feb. 15, 1955, pages 26 and 27.